Oct. 11, 1949.　　　J. R. STEINHOFF　　　2,484,194
ELECTRONIC TUBE

Filed March 30, 1945　　　　　　　　　　2 Sheets-Sheet 1

Inventor:
John R. Steinhoff
By Pierce + Scheffler
Attorneys.

Oct. 11, 1949. J. R. STEINHOFF 2,484,194
ELECTRONIC TUBE
Filed March 30, 1945 2 Sheets-Sheet 2
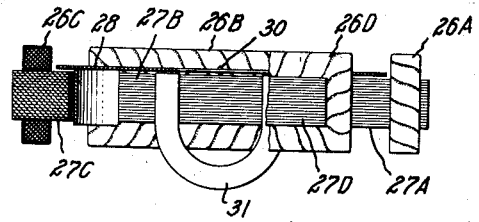
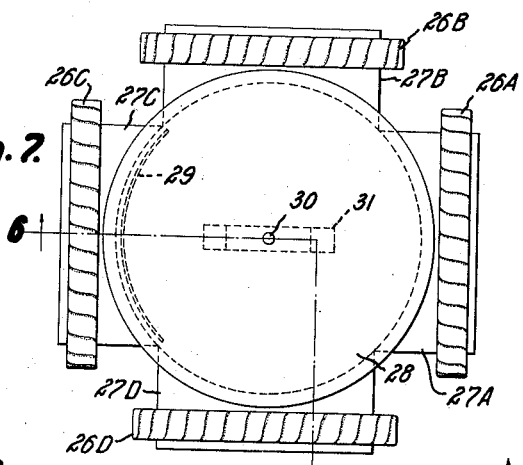
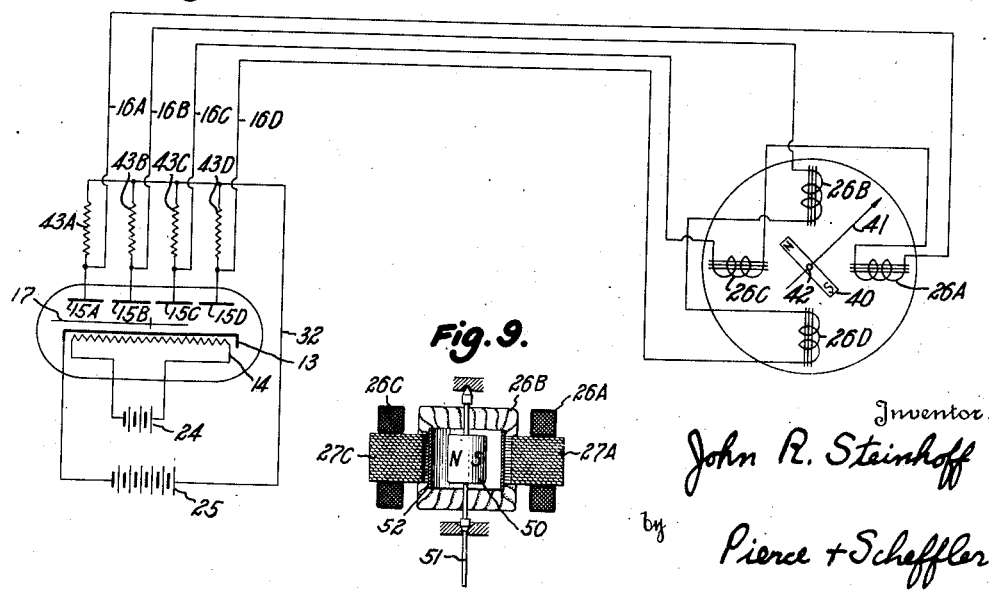
Inventor:
John R. Steinhoff
by
Pierce + Scheffler
Attorneys.

Patented Oct. 11, 1949

2,484,194

UNITED STATES PATENT OFFICE

2,484,194

ELECTRONIC TUBE

John R. Steinhoff, Brooklyn, N. Y., assignor to J. Gregory Poole, Raleigh, N. C.

Application March 30, 1945, Serial No. 585,613

1 Claim. (Cl. 250—27.5)

This invention relates to a novel electronic tube particularly adapted for use as a transmitter of signals indicating angular movement and to a telemetric or servo-motor system including the new tube.

A purpose of the invention is the provision of a tube adapted to transmit position indicating signals with a minimum torque demand.

A further purpose of the invention is the provision of a device of high sensitivity for indicating positional data at a distance.

Another purpose of the invention is the provision of a system for reproducing amplified torque at a distance.

Other purposes and advantages of the invention will be apparent from the following description.

The electronic tube of the invention in its typical form comprises a plurality of diode assemblies in a common evacuated envelope, a shield member mounted for movement between the complementary electrodes of the diodes and means responsive to a force external to the envelope for effecting movement of the shield member. When intended for use in indicating angular position, such as compass directions, the electrode elements of the diode assemblies are preferably of annular form, disposed so as to provide an annular interelectrode space of substantially uniform distance between the electrodes. The plurality of diodes may be provided by splitting either the anode or cathode, or both, into a plurality of sectors insulated from each other. For constructional reasons it is, in general, simpler to subdivide the anode into insulated sectors, although the electrode surface of the cathode may be so subdivided, such sectors being heated by a common heating element or by separate heating elements, or the cathode surfaces may be provided by the heating elements themselves. The movable shield member is positioned in the interelectrode space substantially parallel to the opposed electrode surface and is mounted for rotation about the axis of the annular electrodes. The shield member is shaped to permit electron flow between the electrodes only in a portion of the interelectrode space, so that upon rotation the potential in the various sectors of the subdivided electrode will vary with the position of the shield member. Advantageously, the shield member is rotated by means of coacting magnets mounted one on the rotating shield magnet assembly and one, connected to the moving member of a position indicating device or the like, outside the envelope of the tube.

The diodes of the tube device may be connected by circuit elements including any suitable power source to current responsive elements of a suitable indicating or electromotive device, for example, to the deflecting elements of a cathode ray oscilloscope, or to the coils of an electrical indicating instrument or an electromotive device, as is more fully described hereinafter.

For the purpose of illustrating the principles of the invention, typical embodiments thereof will be more particularly described with reference to the accompanying drawings in which:

Fig. 6 is a side elevation, in partial section on line 6—6 of Fig. 7, of an indicating instrument suitable for use in the telemetric system of the invention;

Fig. 7 is a plan view of the indicating instrument of Fig. 6;

Fig. 8 is a circuit diagram of a modified embodiment of the invention, and

Fig. 9 is a sectional elevation of an electromotive device suitable for use in the telemetric or telemotive system of the invention.

Figure 1:
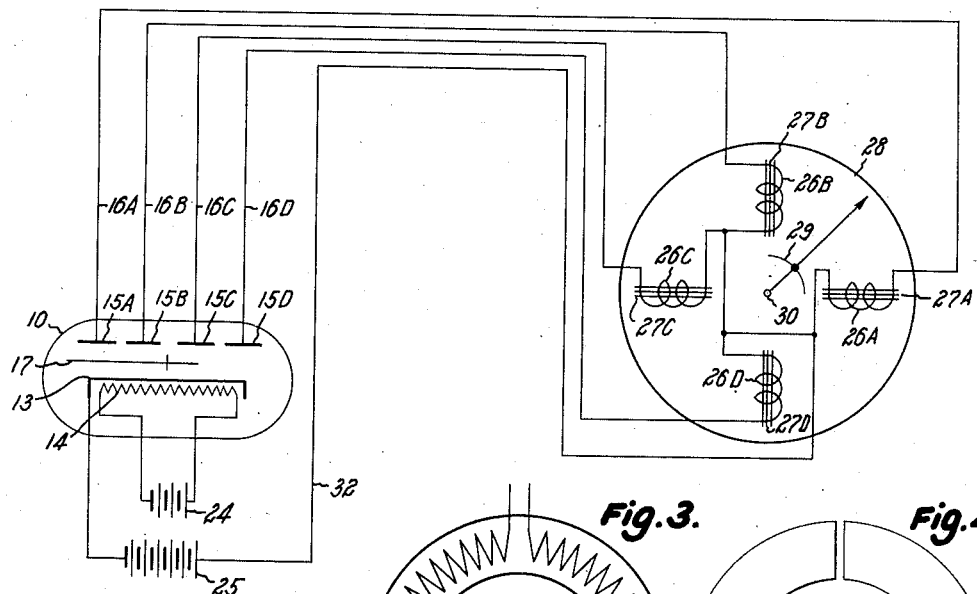
Fig. 1 is a circuit diagram of a telemetric system embodying the principles of the invention.
Figure 3:
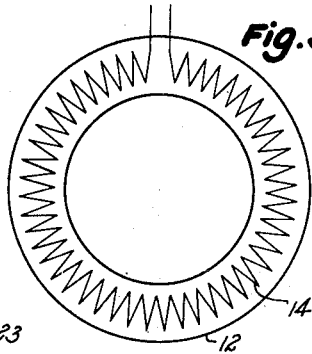
Figs. 3, 4 and 5 are enlarged diagrammatic plan views of the cathode, anode and rotating shield assembly of the tube, respectively.
Figure 4:
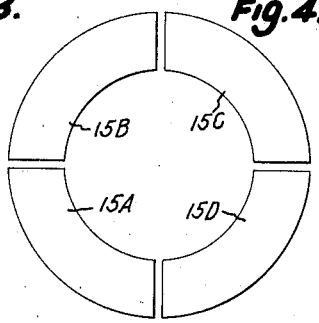
Figure 2:
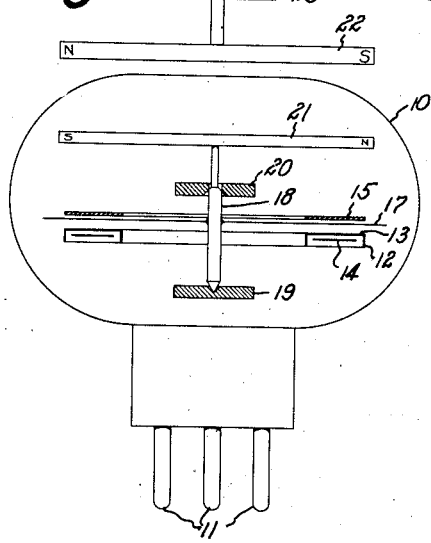
Fig. 2 is a diagrammatic elevation in partial section of the electronic tube of the invention.
Figure 5:
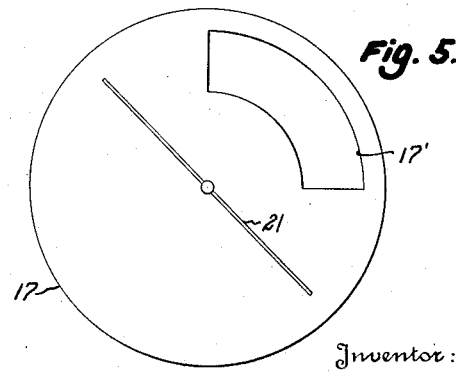

Referring more particularly to Figs. 2 to 5, the illustrative form of the electron tube of the invention comprises an evacuated envelope 10 provided with the conventional contact prongs 11. Mounted in the envelope in generally concentric and radially parallel position are an annular cathode 12 consisting of an electron-emitting surface member 13 and a heater element 14 supplied by a suitable source of current 24 (Fig. 1); an annular anode 15 consisting of four quadrant sectors 15A, B, C, D electrically insulated from each other and provided with separate leads 16A, B, C, D (Fig. 1); and a rotatable shield assembly comprising shield member 17 having a sectorial window 17', preferably occupying a quadrant of the interelectrode space and mounted on a staff 18. The staff is mounted for rotation on suitable bearings 19, 20. Affixed to the upper end of the staff is a permanent magnet 21. The shield member should be made of a heat-resistant material of low electron-emitting property, such as aluminum or a ceramic material.

Under the influence of the magnetic force of a complementary magnet 22, outside the tube envelope, attached to the moving system of an instrument 23, such as a magnetic compass, the magnet 21 will cause the shield assembly to rotate in response to the rotation of the moving system of the instrument and thereby to permit flow of electrons, from a suitable current source 25 (Fig. 1), from the cathode 12 to the sector or sectors 16 of the anode opposite the shield window 17' thus generating a potential in the anode sectors corresponding to the position of the moving element of the instrument.

Referring to Figs. 6 and 7, the indicating instrument advantageously comprises a plurality of fixed coils 26A, B, C, D wound on armatures 27A, B, C, D and positioned about the periphery of the pointer system of the indicating instrument. The pointer system of the instrument comprises an indicator disk 28, which may be of copper or aluminum, carrying a magnetic field responsive element, such as soft iron member 29, adjacent a portion of the periphery of the disk. The disk is mounted on central pivots 30 for rotation about 360° and is advantageously damped by means of fixed permanent magnet 31.

When the coils are connected at one end of each to the corresponding anode sector 15 of the transmitter tube by leads 16 (Fig. 1) and at the other end to the cathode 13 by means of a circuit including lead 32 and current source 25, the force induced in the coil armature assemblies of the indicating instrument by current flowing from the corresponding diodes of the transmitter tube will urge the indicator disk 28 into a position corresponding to the position of the rotating shield 17 of the tube and therefore to the position of the moving system to which the rotating shield assembly is responsive.

It will be noted that the torque required to operate the transmitter is independent of the torque desired at the indicating or electromotive instrument as the rotating shield requires only the torque necessary to overcome the friction of the supporting bearings which may be made extremely low. The available torque is thus dependent solely on the current handling capacity of the tube, which is solely a matter of tube size and design. Any desired number of indicating instruments may be operated from a single transmitter tube, or a suitable motor device may be substituted for the indicating instrument and mechanical devices may be operated thereby at remote points. Although the heating current and plate current supplies have been indicated conventionally as batteries, any convenient source of direct or alternating current may be used to operate the tube and associated telemetric system as the tube operates as a rectifier.

By suitable design of the shield member, linear attenuation of the current passing the shield with radial motion thereof may readily be attained when desired.

Suitable adjustable elements may be introduced into the leads to the indicator or into the indicating instrument itself (as described in my application Serial No. 417,835, filed November 4, 1941, now U. S. Patent No. 2,392,420, issued January 8, 1946) for the purpose of calibrating the system for constant sources of inaccuracy in the system, such as lack of parallelism or of uniformity in the electrodes of the tube, or external to the system, such as stray magnetic fields and the like.

In the modified embodiment of the telemetric system shown in Fig. 8, the indicating instrument includes fixed coils and associated armatures as in the instrument of Figs. 1, 6 and 7, but the indicator consists of a pivotally mounted permanent magnet 40 carrying a pointer 41 and pivotally mounted at 42 for rotation through 360°. The anode sectors 15 are connected serially through corresponding opposite coils 26 and thence to the cathode through resistances 43 so that a reversal of polarity of the fields generated by the coils occurs as the shield member rotates between the electrodes, thus urging permanent magnet 40 and associated pointer 41 into an angular position corresponding to the position of the shield member.

The device shown in Fig. 9 is a further modification which may be used as an indicating or operating device. As shown, it is particularly adapted for operating control mechanisms in response to signals from the transmitter of the invention.

It comprises coils 26 and associated armatures 27 as in the indicating devices of Figs. 1, 6, 7 and 8. A cylindrical permanent magnet 50, magnetized with its opposite poles diametrically opposed in the cylinder is mounted on staff 51 for rotation within the fields of the coil-armature assemblies. Annular member 52 of copper or aluminum serves to damp the rotation of the magnet 50. The lower end of the staff 51 may be connected to any desired control device, such as a fluid pressure valve, a variable condenser or variable inductance of an electronic device or the like. The staff 51 may, of course, also carry an indicator member so that the device will serve both for indication and control.

I claim:

An electronic tube comprising an envelope, an annular anode and an annular cathode positioned in said envelope to define a generally annular interelectrode space, said anode comprising a plurality of electrically insulated sectors, a shield member completely insulated within said envelope mounted for rotation through said annular interelectrode space to occupy successive portions thereof, and means responsive to a force external to said envelope for rotating said shield members.

JOHN R. STEINHOFF.

REFERENCES CITED

The following references are of record in the file of this patent:

UNITED STATES PATENTS

| Number | Name | Date |
|---|---|---|
| 1,997,986 | Thomas | Apr. 16, 1935 |
| 2,068,775 | Stettler | Jan. 26, 1937 |
| 2,179,673 | Smith | Nov. 14, 1939 |
| 2,225,032 | Carbonara | Dec. 17, 1940 |
| 2,416,678 | Borsum | Mar. 4, 1947 |